Nov. 15, 1960
L. T. SEAMAN
2,959,866
ERROR COMPENSATED DIRECTIONAL SYSTEMS
Filed Dec. 31, 1956
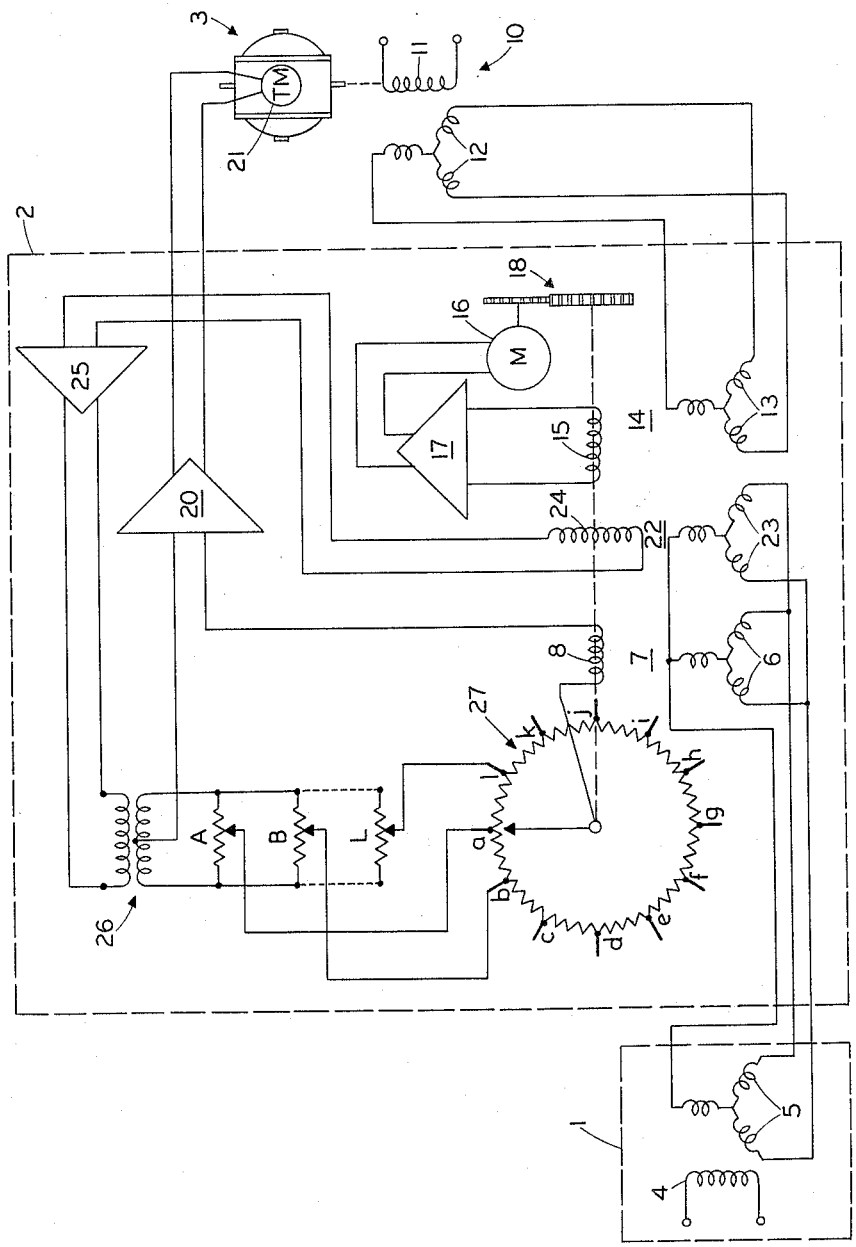
Inventor:
Lewis T. Seaman
by Richard E. Hosley
His Attorney United States Patent Office 2,959,866
Patented Nov. 15, 1960

2,959,866

ERROR COMPENSATED DIRECTIONAL SYSTEMS

Lewis T. Seaman, Havertown, Pa., assignor to General Electric Company, a corporation of New York Filed Dec. 31, 1956, Ser. No. 631,738

5 Claims. (Cl. 33—224)

This invention relates to directional systems and, more particularly, to improved compass controlled directional systems wherein errors are minimized.

An effective error compensation scheme in a compass controlled directional system must be capable of correcting for errors of differing types derived from various sources. Stray magnetic fields in the vicinity of the field sensing element, for example, will introduce an error into the system varying sinusoidally with azimuth. On the other hand, soft iron nearby will, by distorting the local field, cause a second harmonic error to appear. A constant deviation error independent of azimuthal orientation may result from a displaced lubber line or from errors originating in the system's amplifier. Not only must an error compensator be able to correct for errors such as these, but when the combined errors cause a peaking in the deviation curve or otherwise result in a rapid change in the slope of the curve, the compensator should be able to follow the rapid changes effectively. Heretofore-proposed mechanical compensator arrangements utilizing flexible cams for adjusting the position of an output data shaft have been unable to compensate sufficiently for large excursions of an error curve. This has been true because of the physical limitations of the flexible cams which do not lend themselves easily to the large distortions required to correct for widely varying deviations.

Because of the inherent defects in prior mechanical compensation arrangements, recourse has been had to electrical compensation devices which interject voltages or fluxes into the directional system at a plurality of intervals or stations corresponding to every few degrees of azimuthal orientation of the system to compensate for the errors of both mechanical and electrical orgin existing at each of these points. Examples of such systems are described in Patent No. 2,519,058, issued August 15, 1950, for "Deviation Compensator" and in Patent No. 2,570,826, issued October 9, 1951, for "Error Compensator," both of which are assigned to the assignee of the present invention. These and other electrical compensation arrangements in directional systems have been capable of compensating for errors of large and varying degrees.

Directional systems, however, are subject to additional sources of error other than those previously mentioned. In systems wherein a rotatable member such as a directional gyroscope is used to represent the azimuthal heading of a movable craft, a compass detector receiving signals from the compass transmitter may produce a phase-and-amplitude characterized control signal whenever the gyroscope or other rotatable member deviates from a position representing the craft's heading. The control signal gradient, which is to say the amplitude of the control signal per unit angular deviation, depends upon many factors. For example, where the compass transmitter is of the so-called earth inductor type, its signal output depends directly upon the local magnetic field strength, and the gradient of the control signal derived from the compass detector is greater or less as the earth's field is more or less intense. Thus, as a craft carrying an earth inductor compass controlled directional system travels poleward, the horizontal component of the earth's local magnetic field gradually decreases in strength, and the control signal derived from the compass detector decreases in amplitude. Under such circumstances an error compensating signal which exactly compensated for an existing error in the control signal at an original geographic location will begin to overcompensate as the craft travels poleward and will actually introduce error into the system.

The signal output of compass transmitters in general, whether of the earth-inductor type or not, may be affected by changes in temperature which may influence the magnetic properties of the materials of which the transmitter is composed. Another factor causing variations in the signal output of compass transmitters is the variability of the excitation potential. These and other factors contribute to variations in the control signal gradient and can reduce the effectiveness of error compensation in the system.

In one aspect of this invention I have provided an error compensated compass-controlled directional gyro system in which two compass detector synchros are utilized. The first of these synchros derives a control signal for correcting the attitude of the gyro when it wanders from a predetermined orientation. The second synchro, however, derives a reference signal, the amplitude of which varies proportionately with the control signal gradient. When carefully preselected amounts of this reference signal are combined with the control signal at various predetermined azimuthal orientations of the directional system, the resulting deviation compensation at any given azimuthal point is a constant angular correction independent of the gradient of the control signal.

It is therefore an object of this invention to provide an improved error compensated directional system in which the amount of angular compensation achieved is unaffected by variations in the control signal gradient.

Although this invention should not be limited, except by a fair interpretation of the appended claims, further details of the invention, as well as additional objects and advantages, will be perceived in connection with the accompanying drawing which represents an improved compass-controlled directional gyro system electrically compensated according to this invention.

In the accompanying drawing there may be seen an earth-inductor type compass transmitter 1 which through the control means 2, governs the azimuthal orientation of directional gyroscope 3. In the preferred arrangement shown, an excitation winding 4, usually energized by a 400-cycle potential, periodically saturates a magnetic core structure, not shown, to cause the earth's field to produce a second harmonic pattern of signals in the polyphase-connected windings 5. Because the compass transmitter is normally positioned horizontally, the pattern of signals so produced is related to and characterizes the direction and strength of the horizontal component of the earth's magnetic field. This pattern of signals is repeated across polyphase-connected windings 6 of compass detector synchro 7. Rotor winding 8 within synchro 7 is so arranged with respect to windings 6 that it derives therefrom a phase-and-amplitude characterized control signal whenever it is caused to depart in one direction or the other from a predetermined orientation with respect to the pattern of potentials existing in windings 6. It is to be understood that if the compass transmitter 1 is caused to rotate in azimuth, a condition obtaining when it is carried by a movable craft in a turn, the field produced by the pattern of signals in windings 5 and 6 will shift. But as long as rotor winding 8 moves during turns and retains its position relative to the shifting field, no control signal will be induced therein.

Actually the signal rotor 8 is caused to follow the movements of the directional gyroscope 3 by servo means to be described below and the control signal is used to slave the gyroscope to a particular azimuthal orientation in a sort of mutual interdependence. Although the slaving and servo positioning means by which the latter purposes may be accomplished should be familiar to those skilled in the art, their functioning will here be described in order to aid in a proper appreciation of my invention and to clarify certain important relationships between elements of the system.

I prefer to provide the directional gyroscope with a position transmitter unit 10 which includes a rotor winding 11 excited from an alternating current source and arranged to rotate in azimuth with the gyro rotor about its output axis. The transmitter unit also includes stator windings 12 which sense the position of rotor windings 11 and transmit signals characterizing its orientation to the stator windings 13 of a servo detector synchro 14. The latter detector synchro includes a rotor winding 15 which produces a phase-and-amplitude characterized signal whenever its position does not correspond to that of the gyro. This signal serves to control reversible motor 16 through servo amplifier 17 so that through a gearing arrangement 18 the rotor winding 15 is driven back into positional correspondence with the gyro. When the positions of the directional gyro and rotor winding 15 exactly coincide, no signal is picked up by the rotor winding. It is therefore said to be at a null position. Relative movement of the gyro with respect to the craft on which it is mounted such as would occur during a turn of the craft or during precessional movements of the gyro rotor structure, will cause the rotor 15 to follow the movements of the gyro. Furthermore, because of the mechanical connection shown in dotted lines between this rotor and rotor winding 8, rotor 8 will also repeat the position of the gyroscope. In so doing, rotor winding 8 will derive a phase-and-amplitude characterized control signal in the manner described above whenever the gyroscope departs from a predetermined orientation with respect to the earth's magnetic field. This control signal when applied to amplifier 20 governs torque motor 21 to cause precessional movements of the gyro in the proper direction to return the gyroscope to its predetermined orientation.

As previously indicated, turning of the craft on which this system is mounted will be accompanied by a rotation of the field in detector synchro 7. Turning of the craft will also be accompanied by relative rotation of the gyroscope to maintain its position in azimuth, and the servo system described above serves to maintain rotor winding 8 in a null position within compass synchro detector 7.

In order to minimize inaccuracies and deviations in directional systems, I propose to combine an error compensating signal with the control signal derived from rotor winding 8 in such a manner that errors in the control signal are substantially eliminated. I have found it to be desirable to derive a reference signal proportional in amplitude to the gradient of the control signal. This reference signal may be converted then into an error-compensating signal by adjustably altering its phase and amplitude by predetermined ratios, as by attenuation, at each of a plurality of intervals corresponding to every few degrees of azimuthal orientation of the directional system. The amplitude of the resulting error compensating signal in the present system then is not only a function of azimuth, but is also a function of the horizontal component of the earth's field and of other factors influencing the control signal gradient. When this error compensating signal is combined with the control signal of the directional system, significant advantages are accrued. For any given angular deviation of rotor winding 8 from its null position within the compass synchro detector 7, a control signal will be produced which is proportional in amplitude to the horizontal component of the earth's local magnetic field, and to other variable factors. By introducing an error compensating signal bearing the same proportionality, the amount of angular correction introduced into the directional system at each azimuthal heading will remain constant regardless of the variable factors influencing the control signal. A preferred compass controlled directional system equipped with this type of constant error compensation may include an additional detector synchro 22, the stator windings 23 of which are connected in parallel with those of detector synchro 7. Rotor winding 24 is driven by the same servo system which orients rotor windings 8 and 15 as shown by the dotted lines, but is arranged to derive a maximum signal from synchro windings 23 when rotor winding 8 is at its null position. Although other positions relative to winding 8 may be selected which will provide a reference signal in winding 24 which is proportional in amplitude to the control signal gradient, I prefer to arrange winding 24 to be effectively at space quadrature within its detector synchro to the position assumed by winding 8 within synchro 7. At this position a maximum reference signal is produced which is least susceptible to variation when rotor winding 8 is not quite at null position.

It should be understood that other arrangements are capable of deriving a reference potential having the desired proportionality. Another such arrangement is described and claimed in a copending application of Emery F. Boose, entitled, "Electrical Error Compensation Arrangements," S.N. 631,737, filed of even date herewith and assigned to the same assignee as that of the present invention, wherein it is shown that a single synchro detector having a pair of rotor windings arranged in space quadrature may fulfill the function of detector synchros 7 and 22 herein. It should not be felt, therefore, that the practice of this invention is necessarily limited to the paired synchro arrangement shown in the accompanying drawing.

In the utilization of the reference signal derived from winding 24, it is desirable to alter the resulting amplitude thereof by selected, predetermined amounts at each of a plurality of preselected headings of the craft on which the directional system may be mounted. In this manner an error compensating signal may be produced which will correct for errors which might otherwise result at each azimuthal heading of the craft. Although various electro-mechanical arrangements for this purpose are already described in the patent literature such as those shown in Patent No. 2,652,545, issued to Donald W. Halfhill on September 15, 1953, and in other patents mentioned therein, I have elected to describe my invention in connection with a unique adjustable electrical compensator described and claimed in the aforesaid copending application in the name of Emery F. Boose. In applying the reference signal to the electrical compensator, I prefer to send it through a linear isolation amplifier 25 to prevent loading of synchro 22, although this may not be necessary in all cases, and to impress the amplifier output on transformer 26 so that the reference signal appears across the center-tapped secondary of the transformer. The full reference signal therefore appears across each of the potentiometers labelled A to L, some of which have been omitted for clarity as indicated by the dotted circuit connections. Each of the fixed multiple contacts on master potentiometer 27 is connected to a movable contact on one of the potentiometers A to L, while the adjustable contact of the master potentiometer is connected in series with rotor winding 8. By virtue of the center-tapped connection on the secondary winding of transformer 26, each of the potentiometers A to L may be adjusted to provide correctly phased, predetermined amounts of the reference potential to each of the fixed contacts on the master potentiometer. Because the adjustable contact of the master potentiometer is ganged with rotor 8 to follow the azimuthal movements of the gyroscope, in its movements from point to point about the potentiometer, it will derive an error-compensating signal which is a function of heading. The shape of the error compensation curve may easily be varied to suit the needs of any given installation by appropriate adjustment of each of the potentiometers A. to L. As is more fully set forth in the aforesaid copending application, the resulting error correction curve has the advantage of providing a smooth straight-line slope between compensation points, making it possible to correct for virtually any combination of errors, whether electrical or mechanical in derivation. Naturally, the greater the number of fixed contacts on the master potentiometer which are provided with adjustable potentials, the smoother will be the resulting error compensation curve.

In connection with the present invention, this electrical compensation arrangement is particularly useful because the wave form of the reference potential applied to it is substantially unmodified in the process of having its amplitude altered. The effect is that the error compensating signal has the same wave form as the control signal, a result which contributes to the reduction of the noise level in the system.

While I have preferred to describe my invention as embodied in a particular directional gyroscope system, it will be apparent that the invention is not limited to the exact system identified and that numerous substitutions and variations may be made in the system within the scope of these teachings.

In one modification, for example, the entire servo system for repeating the position of the gyro identified by numbers 10 through 18, could, if desired, be replaced by a mechanical coupling, a principal advantage in the servo system being to permit the remote location of the gyro from the rest of the system. The gyroscope itself could be replaced by any other rotatable direction indicating member such as a simple pointer moving over a scale, and for the torque motor could be substituted any other reversible drive means for causing movement of the rotatable member. The latter substitutions would ordinarily be made where the advantages of inherent gyroscopic rigidity could be dispensed with. Furthermore, as has been previously suggested, other compensator arrangements than the potentiometric system described may be substituted for accomplishing an adjustable alteration in amplitude of the reference signal at each of the several stations corresponding to azimuthal headings. These, as well as other variations in directional systems within the scope of the following claims, will doubtless occur to those skilled in the art to which this invention pertains.

What I claim as new and desire to secure by Letters Patent of the United States is:

1. An error compensated directional system for movable craft comprising: a directional gyroscope; means for precessing said gyroscope in azimuth; compass transmitting means providing a signal output varying with azimuthal orientation of said craft; electrical means controlled by said compass transmitting means and said gyroscope for producing a control signal upon departure of said gyroscope from a predetermined orientation; means controlled by said control signal for causing said precessing means to return said gyroscope to said predetermined orientation; means deriving a reference signal from the signal output of said compass transmitting means proportional in amplitude to the gradient of said control signal; means adjustably altering the amplitude of said reference signal by a fixed preselected ratio at each of a plurality of preselected headings of said craft to produce an error compensating signal which is a function of azimuthal heading; and means combining said error compensating signal with said control signal.

2. An error compensated directional system for movable craft comprising: a directional gyroscope; slaving means for maintaining said gyroscope at a predetermined orientation including compass transmitting means producing a plurality of electrical signals characterizing the direction of the earth's magnetic field, a compass repeating system having field elements connected to receive said signals from said transmitting means and arranged to produce corresponding patterns of magnetic fluxes, a signal rotor angularly positioned by said gyroscope to derive a phase-and-amplitude characterized control signal from said magnetic fluxes upon departure of said gyroscope from said predetermined orientation, and means responsive to said control signal for causing said gyroscope to precess back to its predetermined orientation; and error correcting means for introducing varying amounts of deviation compensation at different azimuthal headings of said craft including means deriving from the electrical signals produced by said compass transmitting means a reference signal proportional in amplitude to the gradient of said control signal, means adjustably altering the amplitude of said reference signal by a fixed predetermined ratio at each of several preselected headings of said craft to produce an error compensating signal which is a function of azimuthal heading, and means combining said error compensating signal with said control signal.

3. An error compensation directional system for movable craft comprising: a directional gyroscope; means generating a phase-and-amplitude characterized control signal upon departure of said gyroscope from a predetermined orientation with respect to the earth's magnetic field; means governed by said control signal for precessing said gyroscope in azimuth to return said gyroscope to said predetermined position; means deriving a reference signal proportional in amplitude to the gradient of said control signal; means adjustably altering the amplitude of said reference signal by a fixed preselected ratio at each of a plurality of preselected headings of said craft to produce an error compensating signal which is a function of azimuthal heading; and means combining said error compensating signal with said control signal.

4. An error compensated directional system for movable craft comprising: a directional gyroscope; means generating a phase-and-amplitude characterized control signal upon departure of said gyroscope from a predetermined orientation with respect to the earth's magnetic field; means generating an error compensating signal which varies in accordance with a predetermined function of the azimuthal heading of said craft and also in accordance with the gradient of said control signal; means combining said error compensating signal with said control signal; and means governed by said combined control and error compensating signals for precessing said gyroscope in azimuth to return said gyroscope to said predetermined orientation.

5. An error compensated directional system for movable craft comprising: a directional gyroscope; means for precessing said gyroscope in azimuth; compass transmitting means generating direction characterizing signals of variable amplitude; a first synchro detector connected to receive said synchro signal and having a first rotor winding positioned by said gyroscope to produce a phase-and-amplitude characterized control signal upon departure of said gyroscope from a predetermined azimuthal orientation; a second synchro detector connected to receive said synchro signal and having a second rotor winding positioned by said gyroscope to produce at all times a reference signal proportional in amplitude to the gradient of said control signal; means adjustably altering the amplitude of said reference signal by a fixed preselected ratio at each of a plurality of preselected headings of said craft to produce an error compensating signal which is a function of azimuthal heading; and means controlling said precessing means in accordance with said control signal and said error compensating signal.

References Cited in the file of this patent

UNITED STATES PATENTS

| | | |
|---|---|---|
| 2,459,830 | McCarthy | Jan. 25, 1949 |
| 2,570,826 | Lundberg et al. | Oct. 9, 1951 |
| 2,581,436 | McCarthy | Jan. 8, 1952 |
| 2,760,146 | Wilentchik | Aug. 21, 1956 |
| 2,762,959 | Welch | Sept. 11, 1956 |